(12) United States Patent
Kimura et al.

(10) Patent No.: US 10,644,295 B2
(45) Date of Patent: May 5, 2020

(54) ENERGY STORAGE DEVICE

(71) Applicant: GS Yuasa International Ltd., Kyoto-shi (JP)

(72) Inventors: Mieko Kimura, Kyoto (JP); Kei Adachi, Kyoto (JP)

(73) Assignee: GS YUASA INTERNATIONAL LTD., Kyoto-Shi, Kyoto (JP)

(*) Notice: Subject to any disclaimer, the term of this patent is extended or adjusted under 35 U.S.C. 154(b) by 23 days.

(21) Appl. No.: 15/922,742

(22) Filed: Mar. 15, 2018

(65) Prior Publication Data

US 2018/0269461 A1 Sep. 20, 2018

(30) Foreign Application Priority Data

Mar. 16, 2017 (JP) .................... 2017-051632

(51) Int. Cl.
*H01M 2/26* (2006.01)
*H01M 10/0525* (2010.01)
*H01M 10/0585* (2010.01)

(52) U.S. Cl.
CPC ......... *H01M 2/26* (2013.01); *H01M 10/0525* (2013.01); *H01M 10/0585* (2013.01); *Y02T 10/6278* (2013.01)

(58) Field of Classification Search
CPC ......... H01M 10/0525; H01M 10/0585; H01M 2/26; B21D 39/03–39/031
See application file for complete search history.

(56) References Cited

U.S. PATENT DOCUMENTS

| | | | |
|---|---|---|---|
| 5,709,965 A | 1/1998 | Grivel et al. | |
| 2006/0096076 A1* | 5/2006 | Rapp ................... | B21D 39/031 |
| | | | 29/525.06 |
| 2016/0254565 A1 | 9/2016 | Wakimoto et al. | |
| 2016/0285134 A1 | 9/2016 | Sasaki et al. | |

FOREIGN PATENT DOCUMENTS

| | | | | |
|---|---|---|---|---|
| JP | H 08-083598 A | 3/1996 | | |
| JP | 2001-338632 A | 12/2001 | | |
| JP | 2004-071199 A | 3/2004 | | |
| JP | 2004-273178 A | 9/2004 | | |
| JP | 2015-005456 A | 1/2015 | | |
| JP | 2015005456 A | * 1/2015 | ............. | H01M 2/14 |
| JP | 2015-037041 A | 2/2015 | | |
| JP | 2016-162544 A | 9/2016 | | |
| JP | 2016-189323 A | 11/2016 | | |

OTHER PUBLICATIONS

MachineTranslation JP2015005456(A) (Year: 2015).*

* cited by examiner

*Primary Examiner* — Robert S Jones
*Assistant Examiner* — Victoria H Lynch
(74) *Attorney, Agent, or Firm* — McGinn IP Law Group, PLLC

(57) ABSTRACT

An energy storage device includes: an electrode assembly including stacked plates, and a positive electrode current collector joined to the stacked plates, wherein the electrode assembly and the positive electrode current collector include a joined portion where the electrode assembly and the positive electrode current collector are joined to each other with a concavo-convex structure where either one of the electrode assembly and the positive electrode current collector projects toward the other of the electrode assembly and the positive electrode current collector, and an outer periphery of the joined portion has a non-circular shape as (Continued)

viewed in a stacking direction of the plates in the joined portion.

16 Claims, 9 Drawing Sheets

ENERGY STORAGE DEVICE

CROSS-REFERENCE TO RELATED APPLICATIONS

This application is based on Japanese Patent Application No. 2017-051632, filed on Mar. 16, 2017, the entire contents of which are hereby incorporated by reference.

FIELD

The present invention relates to an energy storage device which includes an electrode assembly having stacked plates, and current collectors which are joined to the stacked plates.

BACKGROUND

Conventionally, there has been known an energy storage device having the configuration where the energy storage device includes an electrode assembly having stacked plates and current collectors, and the stacked plates and the current collectors are joined to each other. For example, JP 2016-189323 A discloses an energy storage device having the configuration where projecting portions of an electrode assembly, lug portions of the current collectors and oppsedly facing lugs of clip members are joined to each other by fitting engagement.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In joining the electrode assembly and the current collector to each other, the stacked plates of the electrode assembly and the current collector are jointed to each other. Although the electrode assembly has a thickness by stacking of the plates, each one of the stacked plates is thin and hence, interlocking between the stacked plates and the current collector becomes difficult compared to a case where two members are joined to each other, for example. Accordingly, in joining the stacked plates and the current collector to each other, a higher joining strength is required compared to the case where two members are joined to each other, for example. Accordingly, also in the configuration where the electrode assembly and the current collector are joined to each other as in the case of the above-mentioned conventional energy storage device, further enhancement of joining strength is desired.

An object of the present invention to provide an energy storage device where a joining strength between an electrode assembly and a current collector can be enhanced.

An energy storage device according to an aspect of the present invention includes: an electrode assembly including stacked plates, and a current collector joined to the stacked plates, wherein the electrode assembly and the current collector include a joined portion where the electrode assembly and the current collector are joined to each other with a concavo-convex structure where either one of the electrode assembly and the current collector projects toward the other of the electrode assembly and the current collector, and an outer periphery of the joined portion has a non-circular shape as viewed in a stacking direction of the plates in the joined portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
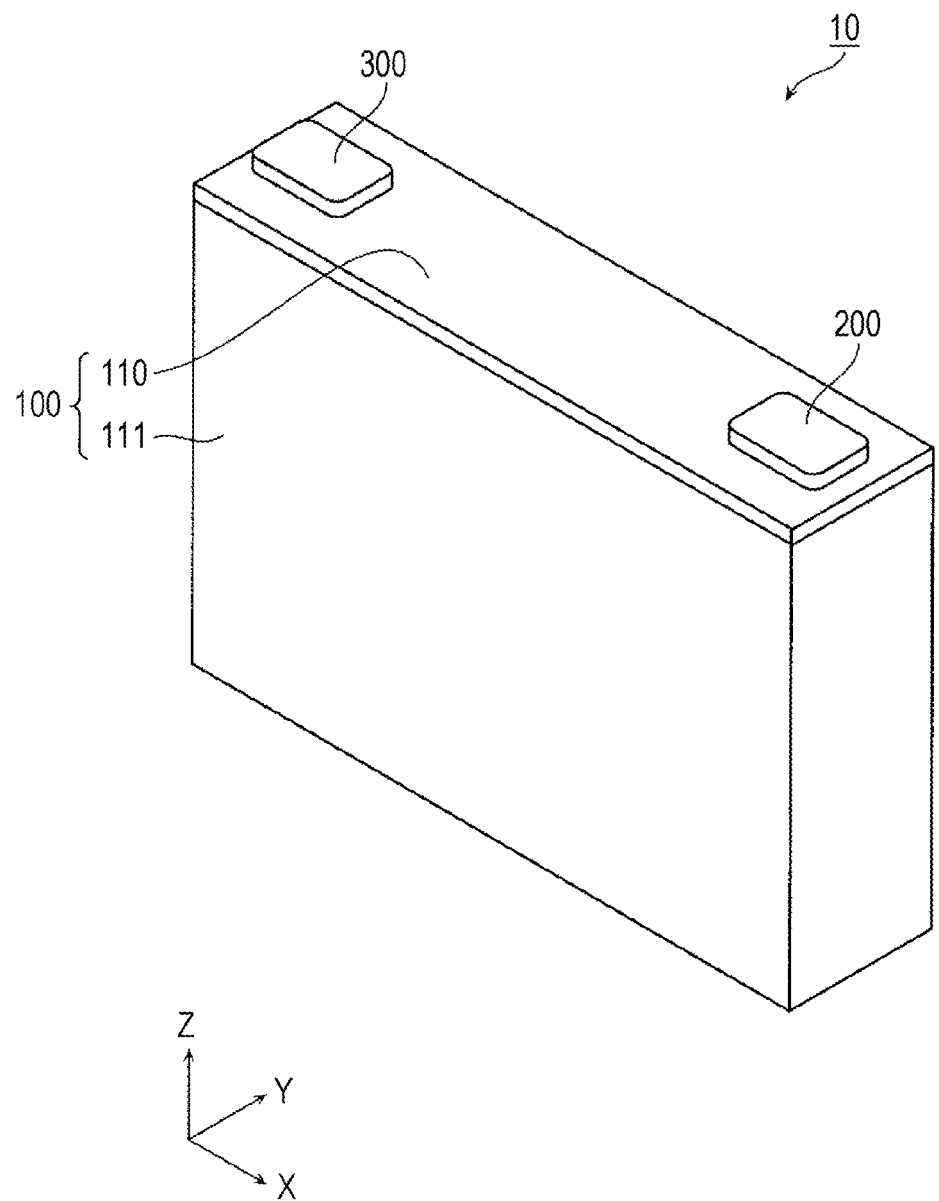
FIG. 1 is a perspective view showing an external appearance of an energy storage device according to an embodiment.

An energy storage device according to an aspect of the present invention includes: an electrode assembly including stacked plates, and a current collector joined to the stacked plates, wherein the electrode assembly and the current collector include a joined portion where the electrode assembly and the current collector are joined to each other with a concavo-convex structure where either one of the electrode assembly and the current collector projects toward the other of the electrode assembly and the current collector, and an outer periphery of the joined portion has a non-circular shape as viewed in a stacking direction of the plates in the joined portion.

With such a configuration, in the energy storage device, the electrode assembly and the current collector include the joined portion where the electrode assembly and the current collector are joined to each other with the concavo-convex structure where either one of the electrode assembly and the current collector projects toward the other of the electrode assembly and the current collector, and the outer periphery of the joined portion has a non-circular shape. Although an outer periphery of a joined portion between an electrode assembly and a current collector is formed in a circular shape in a conventional energy storage device, in this case, the outer periphery of the joined portion has a uniform joining strength over the whole periphery of the circular shape. However, the configuration which has the uniform joining strength also means that although portions where a joining strength is low do not exist, portions having a high joining strength do not also exist. Accordingly, when the outer periphery of the joined portion has a circular shape, there may be a case where a joining strength becomes insufficient. To the contrary, inventors of the present invention have found that by intentionally making a joining strength non-uniform, although there exist portions where a joining strength is low, portions having a high joining strength also exist, and such a configuration can overcome a shortage of a joining strength. In this manner, according to the energy storage device of the present invention, the outer periphery of the joined portion between the electrode assembly and the current collector has a non-circular shape and hence, strong joining can be acquired at portions where a joining strength is high whereby a joining strength between the electrode assembly and the current collector can be enhanced.

The outer periphery of the joined portion may have a plurality of bulged portions and at least one depressed portion which connects the plurality of bulged portions to each other as viewed in the stacking direction.

With such a configuration, in the energy storage device, the outer periphery of the joined portion has the plurality of bulged portions and the depressed portions which connect the plurality of bulged portions to each other and hence, the difference in joining strength between portions can be increased. Although a joining strength of the depressed portion becomes low, a joining strength of the bulged portion becomes high and hence, in the bulged portion, a joining strength between the electrode assembly and the current collector can be enhanced.

The plurality of respective bulged portions may be formed such that a bulging amount of one side of the bulged portion toward the outside is large in a cross section on a plane parallel to the stacking direction compared to the depressed portion.

With such a configuration, the bulged portion is formed such that either one of the electrode assembly and the current collector is largely bulged toward the outside compared to the depressed portion and hence, one bulged portion bites into the other bulged portion. Accordingly, in the bulged portion, strong interlocking can be acquired and hence, a joining strength between the electrode assembly and the current collector can be enhanced.

The plurality of bulged portions may have two first bulged portions which bulge opposite to each other along a first direction perpendicular to the stacking direction as viewed in the stacking direction.

With such a configuration, two first bulged portions are portions which are bulged opposite to each other (reverse directions) along the first direction and hence, two first bulged portions are disposed on both sides of the joined portion in the first direction. Accordingly, on both sides of the joined portion, a joining strength between the electrode assembly and the current collector can be enhanced and hence, the electrode assembly and the current collector can be strongly joined to each other in a well-balanced manner.

The plurality of bulged portions may further have two second bulged portions which bulge opposite to each other along a second direction which is perpendicular to the stacking direction and intersects with the first direction as viewed in the stacking direction.

With such a configuration, two second bulged portions are portions which are bulged opposite to each other (reverse directions) in the second direction and hence, two second bulged portions are disposed on both sides of the joined portion in the second direction. Accordingly, at four corners of the joined portion, a joining strength between the electrode assembly and the current collector can be enhanced and hence, the electrode assembly and the current collector can be strongly joined to each other in a further well-balanced manner.

The current collector may have a leg portion on which the joined portion is formed, and the joined portion may be arranged such that the first direction and the second direction intersect with a width direction of the leg portion.

When end portions of the stacked plates of the electrode assembly are projected at the joined portion, the plates are disposed in a stepped overlapping manner at the end portions thus giving rise to a case where the stacking number of the plates is decreased in a direction toward an end portion side. In this case, the stacking number is decreased toward a width direction of leg portions of the current collector and hence, when joining is performed at a portion where the stacking number of the plates is small, a joining strength is lowered. To the contrary, the joined portion is disposed such that the first direction and the second direction intersect with the width direction of the leg portion of the current collector and hence, the bulged portion can be disposed in a straddling manner between the portion where the stacking number is small and the portion where the stacking number is large. Accordingly, it is possible to suppress lowering of a joining strength between the electrode assembly and the current collector and hence, a joining strength between the electrode assembly and the current collector can be enhanced.

The present invention can be realized not only in the form of an energy storage device but also in the form of a joining structure between an electrode assembly and a current collector which the energy storage device includes.

According to the energy storage device of the present invention, a joining strength between the electrode assembly and the current collector can be enhanced.

Hereinafter, an energy storage device according to an embodiment of the present invention is described with reference to drawings. The embodiment described hereinafter is comprehensive and specific example of the present invention. In the embodiment described hereinafter, numerical values, shapes, materials, constitutional elements, the arrangement positions and connection states of the constitutional elements, manufacturing steps (forming method), the order of manufacturing steps and the like are merely examples, and these are not intended to be used for limiting the present invention. Out of the constitutional elements in the embodiment described hereinafter, the constitutional elements which are not described in independent claims describing an uppermost concept are described as arbitrary constitutional elements. In the respective drawings, the respective constitutional elements are not described strictly accurately in size or the like.

In the description made hereinafter and drawings, an arrangement direction of a pair of electrode terminals which an energy storage device includes, an arrangement direction of a pair of current collectors, an arrangement direction of both end portions of an electrode assembly (a pair of active material layer non-formed portions), a winding axis direction of the electrode assembly, a width direction of a leg portion of the current collector, or an opposedly facing direction of short side surfaces of a container is defined as an X axis direction. An opposedly facing direction of long side surfaces of the container, a lateral direction of the short side surface of the container, a thickness direction of the container, or an arrangement direction of the electrode assembly and the current collector at a joined portion is defined as a Y axis direction. An arrangement direction of a container body and a lid of the energy storage device, a longitudinal direction of the short side surface of the container, an extending direction of the leg portion of the current collector, or a vertical direction is defined as a Z axis direction. These X axis direction, Y axis direction, and Z axis direction are directions intersecting with each other (orthogonal to each other in this embodiment). There may be also a case where the Z axis direction does not agree with the vertical direction depending on a use state of the energy storage device. However, in the description made hereinafter, for the sake of convenience, the description is made by assuming that the Z axis direction agrees with the vertical direction. In the description made hereinafter, a plus side in the X axis direction indicates an arrow direction side of an X axis, and a minus side in the X axis direction indicates a side opposite to the plus side in the X axis direction. The same goes also for the Y axis direction and the Z axis direction.

Embodiment

Figure 2:
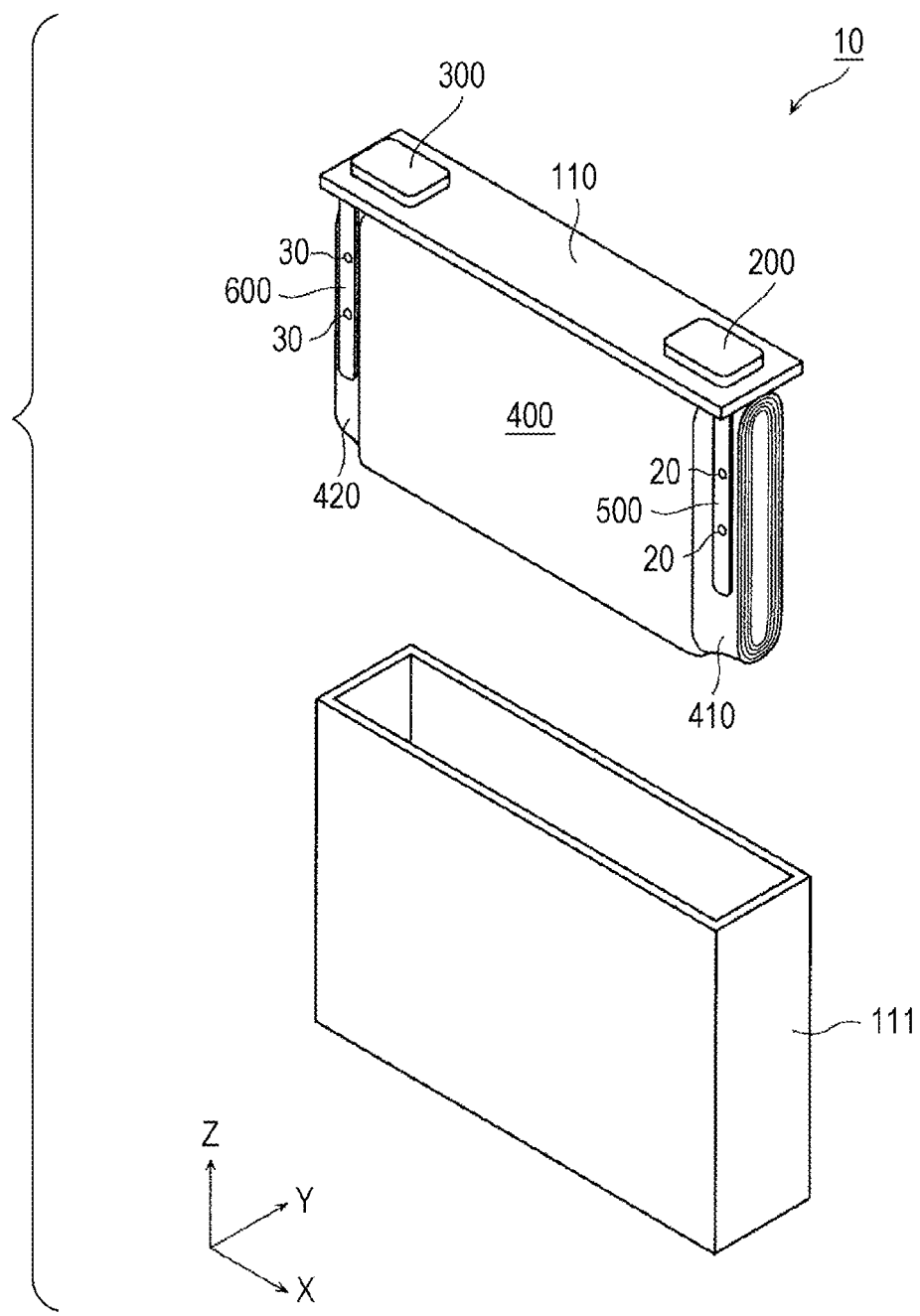
FIG. 2 is a perspective view showing constitutional elements disposed in the inside of a container of the energy storage device according to the embodiment.
Figure 3:
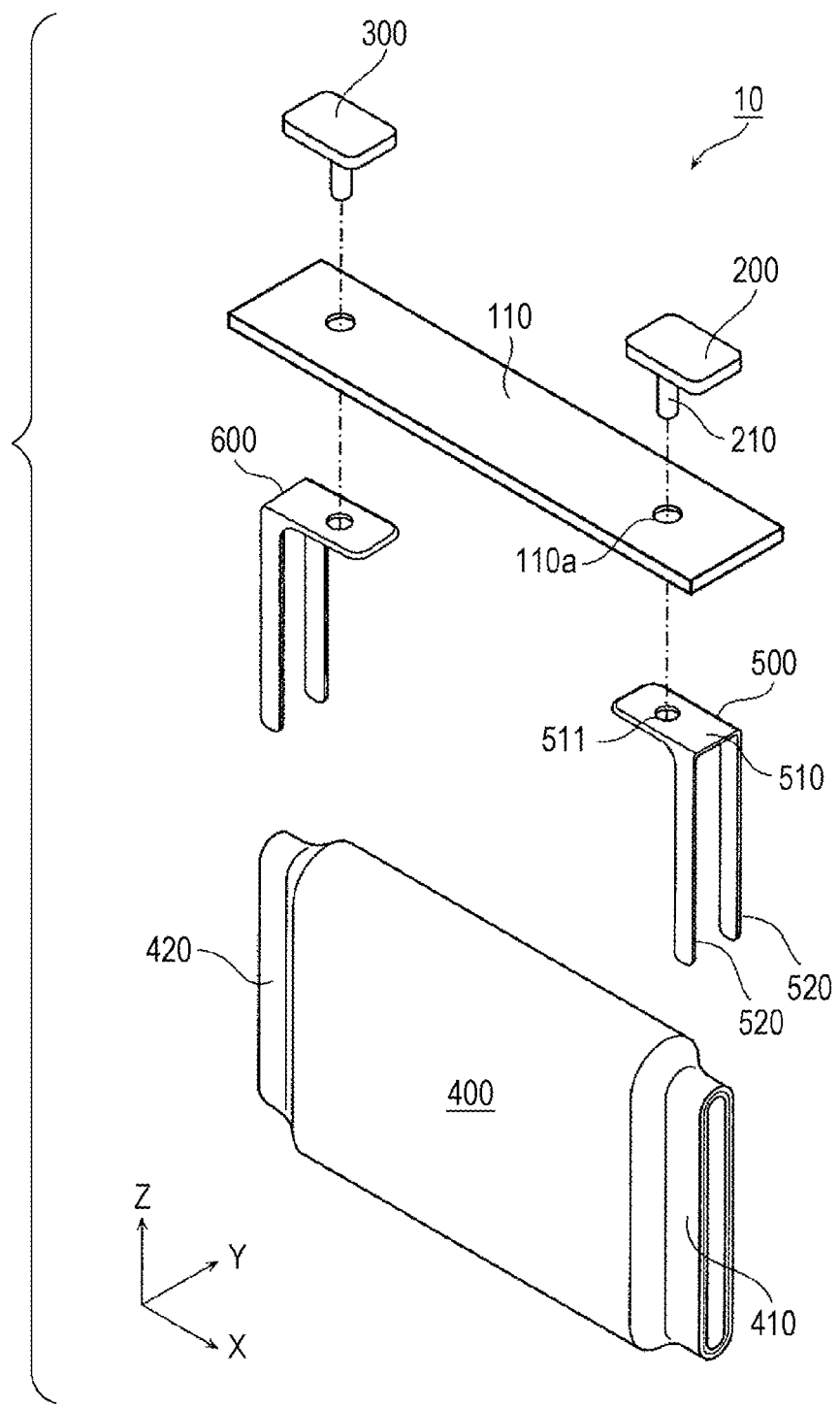
FIG. 3 is an exploded perspective view showing respective constitutional elements of the energy storage device by disassembling the energy storage device according to the embodiment.

First, an overall configuration of an energy storage device 10 according to an embodiment of the present invention is described with reference to FIG. 1 to FIG. 3. FIG. 1 is a perspective view showing an external appearance of the energy storage device 10 according to this embodiment. FIG. 2 is a perspective view showing constitutional elements disposed in the inside of a container 100 of the energy storage device 10 according to this embodiment. FIG. 2 is a perspective view showing the configuration of the energy storage device 10 in a state where a container body 111 is separated from the energy storage device 10. FIG. 2 shows a state after a positive electrode current collector 500 and a negative electrode current collector 600 are joined to an electrode assembly 400. FIG. 3 is an exploded perspective view showing respective constitutional elements of the energy storage device 10 by disassembling the energy storage device 10 according to this embodiment. FIG. 3 shows a state before the positive electrode current collector 500 and the negative electrode current collector 600 are joined to the electrode assembly 400. In FIG. 3, the illustration of the container body 111 is omitted.

The energy storage device 10 is a secondary battery which can be charged with electricity and can discharge electricity. The energy storage device 10 may be a nonaqueous electrolyte secondary battery such as a lithium ion secondary battery. The energy storage device 10 is applicable to a power source for an automobile such as an electric vehicle (EV), a hybrid electric vehicle (HEV), a plug-in hybrid electric vehicle (PHEV), a power source for electronic equipment, a power source for power storage application, for example. The energy storage device 10 is not limited to a nonaqueous electrolyte secondary battery, and may be a secondary battery other than a nonaqueous electrolyte secondary battery, or may be a capacitor and, further, the energy storage device 10 may be a primary battery where a user can use stored electricity without charging. In this embodiment, although the energy storage device 10 has a rectangular shape (an angular shape), the shape of the energy storage device 10 is not limited to a rectangular shape, and the energy storage device 10 may have a circular columnar shape or an elongated circular columnar shape, and a laminate-type (pouch-type) energy storage device may be also used as the energy storage device 10.

As shown in FIG. 1, the energy storage device 10 includes a container 100, a positive electrode terminal 200, and a negative electrode terminal 300. As shown in FIG. 2, the electrode assembly 400, the positive electrode current collector 500, and the negative electrode current collector 600 are accommodated in the inside of the container 100.

For enhancing insulation property and gas-tightness, a gasket or the like is disposed between the lid body 110 and the positive electrode terminal 200 and between the lid body 110 and the positive electrode current collector 500 respectively. However, in FIG. 1, the illustration of these components is omitted. The same goes also for the negative electrode side. Although an electrolyte solution (non-aqueous electrolyte) is sealed in the container 100, the illustration of such an electrolyte solution is omitted. The kind of the electrolyte solution is not particularly limited and any kind of electrolyte solution can be selected provided that performance of the energy storage device 10 is not impaired. In the energy storage device 10, besides the above-mentioned constitutional elements, spacers which are disposed on a side of the positive electrode current collector 500 and on a side of the negative electrode current collector 600 respectively, a gas release valve for releasing a pressure when a pressure in the container 100 is increased, an insulation film which embraces the electrode assembly 400 and the like, may be disposed.

The container 100 is formed of: the container body 111 which has a bottomed rectangular cylindrical shape; and the lid body 110 which is a plate-like member for closing an opening of the container body 111. The container 100 is configured such that the inside of the container 100 can be hermetically sealed by joining the lid body 110 and the container body 111 to each other by, e.g., welding after the electrode assembly 400 and the like are accommodated in the inside of the container 100. A material for forming the lid body 110 and a material for forming the container body 111 are not particularly limited. For example, weldable metal such as stainless steel, aluminum or an aluminum alloy can be used. A resin can be also used.

The electrode assembly 400 is an energy storage element (power generating element) which includes a positive electrode plate, a negative electrode plate, and a separator, and can store electricity. The positive electrode plate is a plate formed by forming a positive active material layer on a positive electrode substrate layer which is a current collecting foil having an elongated strip shape and made of aluminum, an aluminum alloy or the like. The negative electrode plate is a plate formed by forming a negative active material layer on a negative electrode substrate layer which is a current collecting foil having an elongated strip shape and made of copper, a copper alloy or the like. As a material for forming the above-mentioned current collecting foil, a known material such as nickel, iron, stainless steel, titan, calcinated carbon, conductive polymer, conductive glass, an Al—Cd alloy or the like can be also suitably used. As a positive active material for forming the positive active material layer and a negative active material for forming the negative active material layer, a known material can be suitably used provided that the material is an active material capable of occluding and discharging lithium ions. As the separator, a microporous sheet made of a resin or a nonwoven fabric can be used.

The electrode assembly 400 is formed by winding the positive electrode plate, the negative electrode plate and the separator in a state where the separator is disposed between the positive electrode plate and the negative electrode plate. The electrode assembly 400 is formed by winding the positive electrode plate and the negative electrode plate with the separator sandwiched between the positive electrode plate and the negative electrode plate in a state where the positive electrode plate and the negative electrode plate are displaced from each other in a winding axis (an imaginary axis parallel to the X axis direction in this embodiment). The positive electrode plate and the negative electrode plate respectively have a portion where an active material is not applied by coating (a portion where an active material layer is not formed) so that a substrate layer is exposed on an end portion of the positive electrode plate and end portion of the negative electrode plate in a direction that the positive electrode plate and the negative electrode plate are displaced from each other.

The electrode assembly 400 has stacked plates (the positive electrode plate and the negative electrode plate). The electrode assembly 400 has a positive electrode converged portion 410 which is formed by stacking and converging active material layer non-forming portions of the positive electrode plate on one end portion of the electrode assembly 400 in the winding axis direction (an end portion on a plus side in the X axis direction). The electrode assembly 400 has a negative electrode converged portion 420 which is formed by stacking and converging active material layer non-forming portions of the negative electrode plate on the other end portion of the electrode assembly 400 in the winding axis direction (an end portion on a minus side in the X axis direction). For example, in the positive electrode plate and the negative electrode plate, a thickness of the active material layer non-forming portion (a current collecting foil) falls within a range of from approximately 5 µm to 20 µm. By bundling approximately thirty to forty active material layer non-forming portions each of which has such a thickness, for example, the positive electrode converged portion 410 and the negative electrode converged portion 420 are formed. In this embodiment, although an elongated circular shape is shown as a cross-sectional shape of the electrode assembly 400, the electrode assembly 400 may have a circular shape or an elliptical shape in cross section.

The positive electrode terminal 200 is an electrode terminal which is electrically connected to the positive electrode plate of the electrode assembly 400, and the negative electrode terminal 300 is an electrode terminal which is electrically connected to the negative electrode plate of the electrode assembly 400. The positive electrode terminal 200 and the negative electrode terminal 300 are metal-made electrode terminals through which electricity stored in the electrode assembly 400 is discharged to a space outside the energy storage device 10, and through which electricity is introduced into a space inside the energy storage device 10 for storing the electricity in the electrode assembly 400. The positive electrode terminal 200 and the negative electrode terminal 300 are mounted on the lid body 110 disposed above the electrode assembly 400. As shown in FIG. 3, the positive electrode terminal 200 is fixed to the lid body 110 together with the positive electrode current collector 500 by inserting a projecting portion 210 into a through hole 110a formed in the lid body 110 and an opening portion 511 formed in the positive electrode current collector 500 and by swaging the projecting portion 210. The same also goes for the negative electrode terminal 300.

The positive electrode current collector 500 is a member having conductivity and rigidity which is disposed between the positive electrode converged portion 410 of the electrode assembly 400 and a side wall of the container body 111, and is electrically connected to the positive electrode terminal 200 and the positive electrode plate of the electrode assembly 400. The negative electrode current collector 600 is a member having conductivity and rigidity which is disposed between the negative electrode converged portion 420 of the electrode assembly 400 and a side wall of the container body 111, and is electrically connected to the negative electrode terminal 300 and the negative electrode plate of the electrode assembly 400.

The positive electrode current collector 500 and the negative electrode current collector 600 are respectively formed of a conductive plate-like member which is disposed in a bent state along a side wall of the container body 111 and the lid body 110 from the side wall of the container body 111 to the lid body 110. The positive electrode current collector 500 and the negative electrode current collector 600 are fixedly connected (joined) to the lid body 110. The positive electrode current collector 500 and the negative electrode current collector 600 are fixedly connected (joined) to the stacked plates which the electrode assembly 400 has, that is, the positive electrode converged portion 410 and the negative electrode converged portion 420 respectively. With such a configuration, the electrode assembly 400 is held (supported) in a state where the electrode assembly 400 is suspended from the lid body 110 by way of the positive electrode current collector 500 and the negative electrode current collector 600 thus suppressing tilting of the electrode assembly 400 which may be caused by vibrations, an impact and the like.

Although a material for forming the positive electrode current collector 500 is not limited, for example, in the same manner as the positive electrode substrate layer of the electrode assembly 400, the positive electrode current collector 500 is made of aluminum, an aluminum alloy or the like. Although a material for forming the negative electrode current collector 600 is not also limited, for example, in the same manner as the negative electrode substrate layer of the electrode assembly 400, the negative electrode current collector 600 is made of copper, a copper alloy or the like.

As shown in FIG. 2, the positive electrode current collector 500 is joined to the positive electrode converged portion 410 of the electrode assembly 400 at a plurality of joined portions 20. The negative electrode current collector 600 is joined to the negative electrode converged portion 420 of the electrode assembly 400 at a plurality of joined portions 30. Hereinafter, schematic configurations around the joined portions 20, 30 are described with reference to FIG. 4. The configuration around the positive-electrode-side joined portion 20 and the configuration around the negative-electrode-side joined portion 30 are substantially equal and hence, hereinafter, the description is made with respect to the configuration around the positive-electrode-side joined portion 20, and the description with respect to the configuration around the negative-electrode-side joined portion 30 is omitted.

Figure 4:
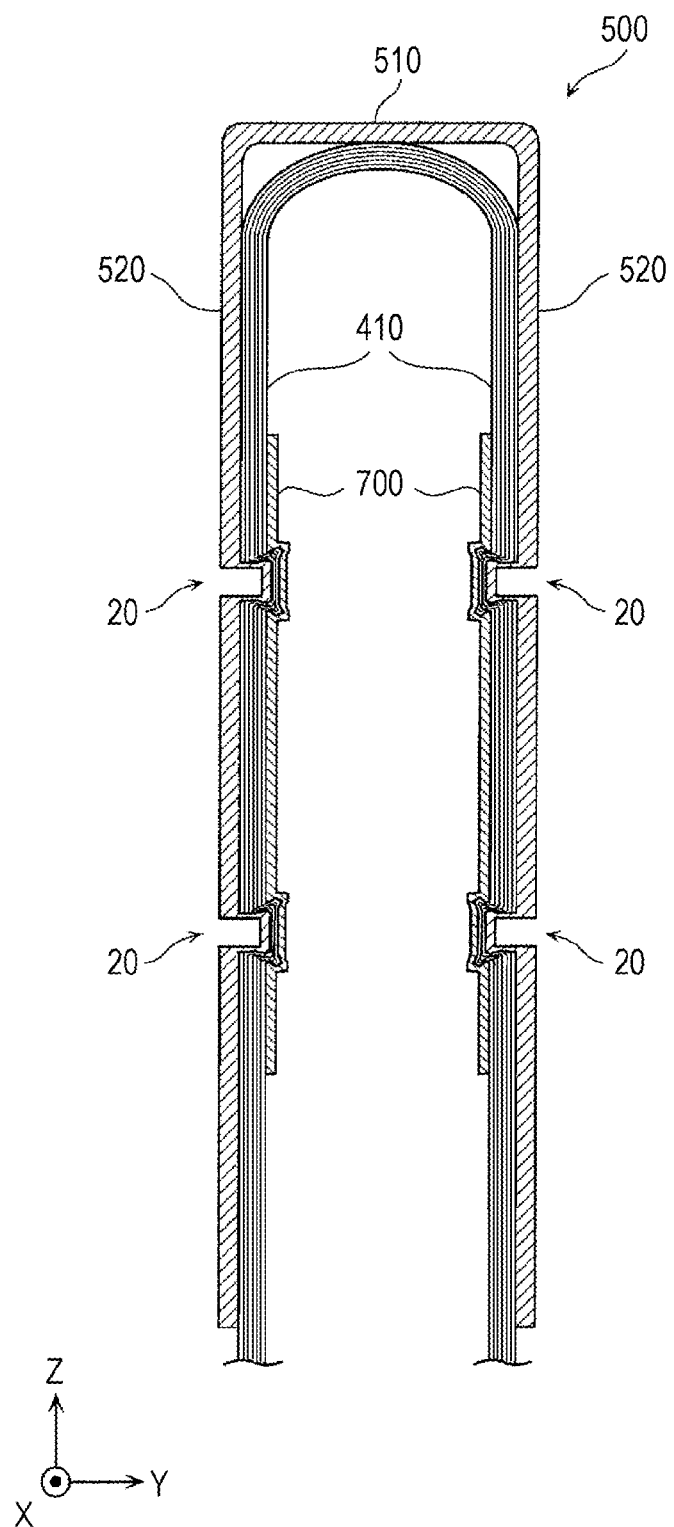
FIG. 4 is a cross-sectional view showing a configuration where a positive electrode current collector according to the embodiment is joined to a positive electrode converged portion of an electrode assembly.

FIG. 4 is a cross-sectional view showing the configuration where the positive electrode current collector 500 according to this embodiment is joined to the positive electrode converged portion 410 of the electrode assembly 400. FIG. 4 shows the configuration when the positive electrode current collector 500 and the positive electrode converged portion 410 shown in FIG. 2 are taken along a YZ plane which passes the joined portions 20.

As shown in FIG. 3 and FIG. 4, the positive electrode current collector 500 includes: a terminal connecting portion 510; and two electrode connecting portions 520 which extend from both end portions of the terminal connecting portion 510 in the Y axis direction toward a minus side in the Z axis direction.

The terminal connecting portion 510 is a base portion of the positive electrode current collector 500 which is connected (joined) to the positive electrode terminal 200. The terminal connecting portion 510 is a flat-plate-like portion disposed on a positive electrode terminal 200 side (an upper side, a plus side in the Z axis direction) of the positive electrode current collector 500, and is electrically and mechanically connected to the positive electrode terminal 200.

The electrode connecting portions 520 are leg portions of the positive electrode current collector 500 which are connected (joined) to the electrode assembly 400. The electrode connecting portions 520 are portions disposed on an electrode assembly 400 side of the positive electrode current collector 500 (a lower side, a minus side in the Z axis direction), and are electrically and mechanically connected to the electrode assembly 400. The electrode connecting portions 520 are elongated and flat-plate-like portions extending in the Z axis direction, and two electrode connecting portions 520 are respectively joined to two opposedly facing flat converged portions of the positive electrode converged portion 410 of the electrode assembly 400.

Cover members 700 are disposed inside the positive electrode converged portion 410, and the electrode connecting portions 520, the positive electrode converged portion 410, and the cover members 700 are mechanically joined to each other so that four joined portions 20 are formed (two joined portions 20 are formed on each of two electrode connecting portions 520). The electrode assembly 400 and the positive electrode current collector 500 include the joined portions 20 where the electrode assembly 400 and the positive electrode current collector 500 are joined to each other in a concavo-convex structure where either one of the electrode assembly 400 and the positive electrode current collector 500 projects toward the other of the electrode assembly 400 and the positive electrode current collector 500. The joined portion 20 is a joined portion having a concavo-convex structure where the electrode connecting portion 520 projects toward the positive electrode converged portion 410. At the joined portion 20, the electrode connecting portion 520 and the positive electrode converged portion 410 are joined to each other by fitting engagement. For example, the joined portion 20 can be formed by swaging (to be more specific, by performing clinch inserting) the electrode connecting portion 520, the positive electrode converged portion 410 and the cover member 700.

The cover member 700 is a cover which protects the positive electrode converged portion 410, and is disposed at a position where the cover member 700 sandwiches the positive electrode converged portion 410 in cooperation with the electrode connecting portion 520. The cover member 700 is a rectangular-shaped flat-plate-like member extending in the Z axis direction along the positive electrode converged portion 410, and is formed to have a uniform thickness in a state before being joined. Although a material for forming the cover member 700 is not particularly limited, for example, in the same manner as the positive electrode substrate layer of the electrode assembly 400, the cover member 700 is a metal member made of aluminum, an aluminum alloy or the like. Cover members are disposed also to the negative electrode side in the same manner as the positive electrode side. And although a material for forming the cover members on the negative electrode side is not also particularly limited, for example, in the same manner as the negative electrode substrate layer of the electrode assembly 400, the cover member is a metal member made of copper, a copper alloy or the like.

Figure 5A:
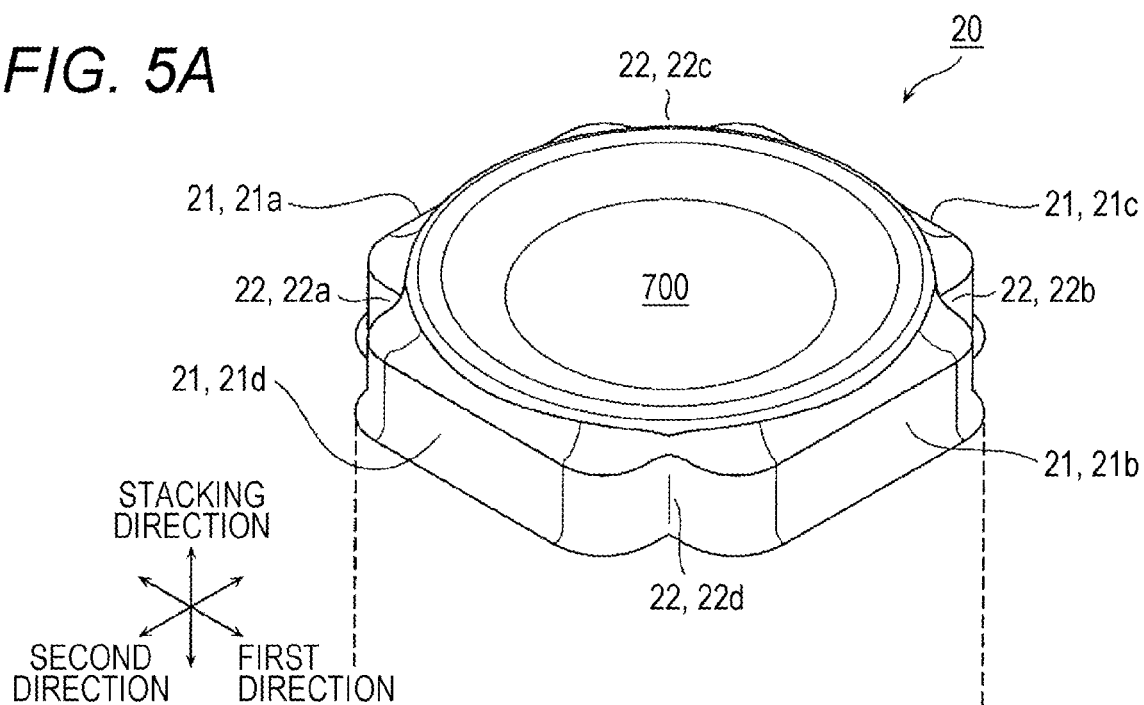
FIGS. 5A and 5B are a perspective view and a plan view showing an external appearance of a joined portion between the positive electrode current collector and the electrode assembly according to the embodiment.
Figure 5B:
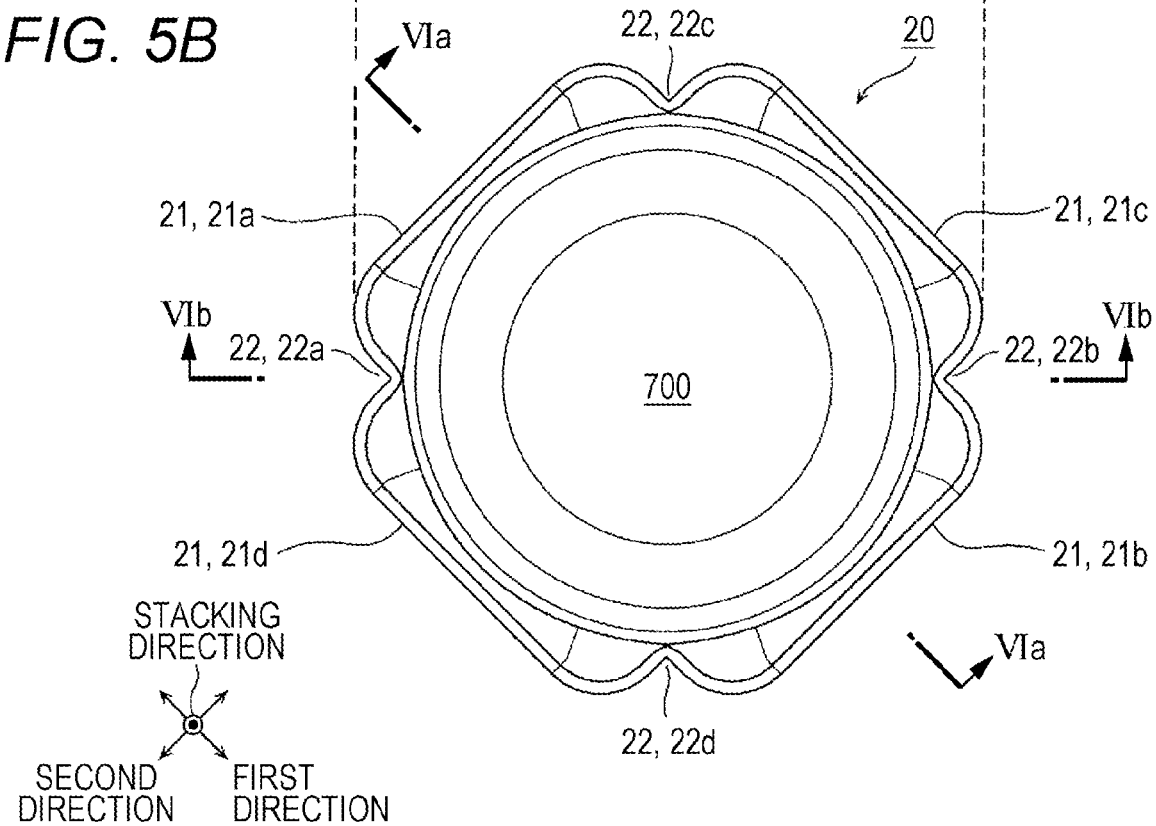

Next, the configuration of the joined portion 20 is described in more detail. First, an external appearance of the joined portion 20 is described. FIG. 5A and FIG. 5B are a perspective view and a plan view showing the external appearance of the joined portion 20 between the positive electrode current collector 500 and the electrode assembly 400 according to this embodiment. FIG. 5A is a perspective view of the joined portion 20 shown in FIG. 4 as viewed from a cover member 700 side (a projecting side), and FIG. 5B is a plan view of the joined portion 20 shown in FIG. 5A as viewed from a cover member 700 side (a projecting side).

As shown in FIG. 5A and FIG. 5B, the joined portion 20 has a non-circular shape as viewed in a stacking direction of plates in the joined portion 20. Here, the stacking direction is a direction that plates are stacked to each other. In this embodiment, the stacking direction is a direction that the plates are stacked to each other in the joined portion 20, and is the Y axis direction in FIG. 4, is a vertical direction in FIG. 5A, and is a direction which penetrates a paper surface on which the drawings are depicted from a front side to a back side in FIG. 5B. The stacking direction can be defined as an arrangement direction of the cover members 700, the positive electrode converged portion 410, and the electrode connecting portions 520 or a projecting direction of the joined portion 20. In this embodiment, the joined portion 20 is formed into an X-like shape as a non-circular shape due to projecting portions of the joined portion 20 as viewed in the stacking direction.

An outer periphery of the joined portion 20 has: a plurality of bulged portions 21 which are bulged outward; and depressed portions 22 which connect the plurality of bulged portions 21 to each other and are depressed inward as viewed in the stacking direction. The bulged portions 21 which form four rectangular-shaped convex portions are disposed respectively corresponding to distal end portions of the outer periphery of the joined portion 20 which respectively project in four directions and form the outer periphery of the joined portion 20 into an X-like shape. Four depressed portions 22 are formed such that each depressed portion 22 which is an inwardly depressed concave portion is disposed between the neighboring two bulged portions 21 respectively.

The plurality of bulged portions 21 include two first bulged portions 21*a*, 21*b* which bulge opposite to each other along a first direction perpendicular to the stacking direction as viewed in the stacking direction. The plurality of bulged portions 21 include two second bulged portions 21*c*, 21*d* which bulge opposite to each other along a second direction which is perpendicular to the stacking direction and intersects with the first direction as viewed in the stacking direction. Two first bulged portions 21*a*, 21*b* are disposed in a projecting manner in directions opposite to each other in the first direction, and two second bulged portions 21*c*, 21*d* are disposed in a projecting manner in directions opposite to each other in the second direction.

The first direction and the second direction are two different directions on a plane perpendicular to the stacking direction. In this embodiment, the first direction and the second direction are two directions orthogonal to each other. The stacking direction, the first direction, and the second direction are three directions orthogonal to each other. The first direction and the second direction are two directions orthogonal to each other on a XZ plane in FIG. 4, and are directions inclined by 45° with respect to the X axis direction and the Z axis direction.

The plurality of depressed portions 22 include two first depressed portions 22a, 22b, and two second depressed portions 22c, 22d. For example, the first depressed portion 22a is a portion connecting the first bulged portion 21a and the second bulged portion 21d to each other. The first depressed portion 22a is a depressed portion formed by bulging the first bulged portion 21a and the second bulged portion 21d in the first direction and in the second direction respectively, and has a shape that a corner portion of the outer periphery of the joined portion 20 is cutout in a square shape. The same goes also for other depressed portions 22.

Figure 6A:
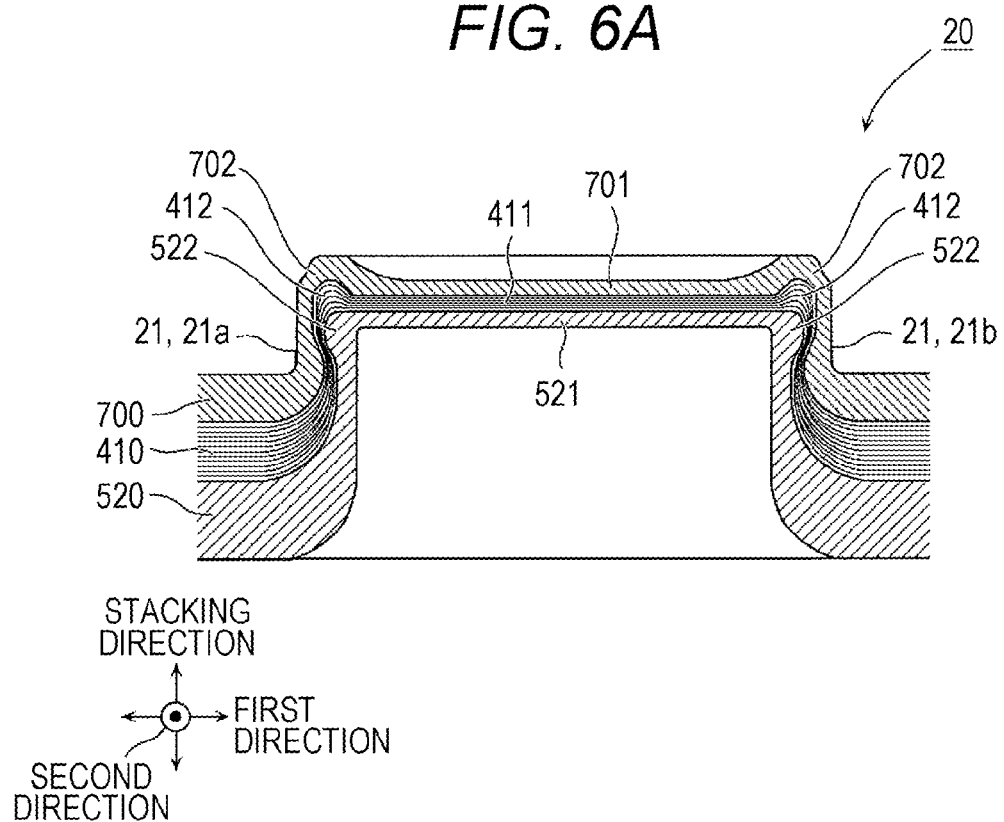
FIGS. 6A and 6B are cross-sectional views showing an internal configuration of the joined portion between the positive electrode current collector and the electrode assembly according to the embodiment.
Figure 6B:
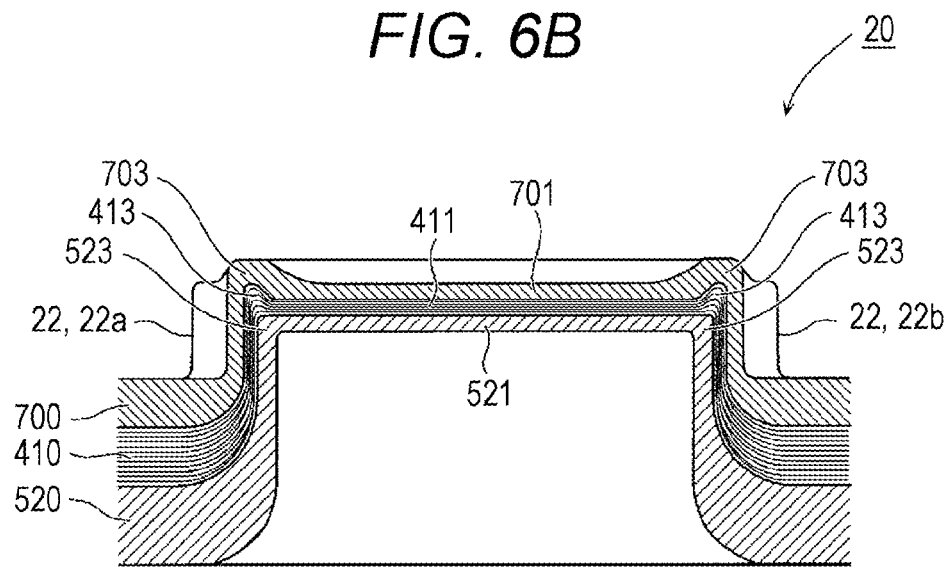

Next, the internal configuration of the joined portion 20 is described. FIGS. 6A and 6B are cross-sectional views showing the internal configuration of the joined portion 20 between the positive electrode current collector 500 and the electrode assembly 400 according to this embodiment. FIG. 6A is a cross-sectional view of the joined portion 20 taken along a line VIa-VIa in FIG. 5B. FIG. 6A shows a cross section of the joined portion 20 on a plane parallel to the stacking direction at a position of the bulged portion 21 (the first bulged portions 21a, 21b in FIG. 5A). FIG. 6B is a cross-sectional view of the joined portion 20 taken along a line VIb-VIb in FIG. 5B. FIG. 6B shows a cross section of the joined portion on a plane parallel to the stacking direction at a position of the depressed portion 22 (the first depressed portions 22a, 22b in FIG. 5B).

First, as shown in FIG. 6A, the electrode connecting portion 520 of the positive electrode current collector 500, the positive electrode converged portion 410 of the electrode assembly 400, and the cover member 700 respectively include convex portions (a current collector convex portion 521, an electrode assembly convex portion 411, and a cover convex portion 701 described later) which project toward the cover member 700 side in the joined portion 20. The convex portions respectively include bulged portions (a current collector bulged portion 522 and an electrode assembly bulged portion 412 described later) which bulge in a direction (in FIG. 6A, at both sides in the first direction) which intersects with the projecting direction (the stacking direction) of the convex portions. The convex portions and bulged portions are formed by plastic deformation of the electrode connecting portion 520, the positive electrode converged portion 410, and a cover member 700 in the joined portion 20, for example. In this embodiment, the convex portions and the bulged portions are formed by swaging (to be more specific, by performing clinch inserting) the electrode connecting portion 520, the positive electrode converged portion 410, and the cover member 700 in the joined portion 20.

In the joined portion 20, the electrode connecting portion 520 has the current collector convex portion 521 which projects toward the positive electrode converged portion 410. The current collector convex portion 521 is a circular cylindrical convex portion which projects in a direction (stacking direction) orthogonal to a joining surface between the electrode connecting portion 520 and the positive electrode converged portion 410 (a plane parallel to the first direction and the second direction). In other words, the current collector convex portion 521 has a shape recessed from an outer surface of the electrode connecting portion 520 toward the positive electrode converged portion 410. The current collector convex portion 521 has the current collector bulged portions 522 which project in a direction which intersects with the projecting direction (stacking direction) of the current collector convex portion 521. In this embodiment, the current collector bulged portions 522 project in a direction perpendicular to the projecting direction (in FIG. 6A, toward both sides in the first direction, hereinafter, also referred to as "outward").

In the joined portion 20, the positive electrode converged portion 410 of the electrode assembly 400 has the electrode assembly convex portion 411 which projects toward the cover member 700. The electrode assembly convex portion 411 is a circular cylindrical convex portion which projects in a direction (stacking direction) orthogonal to a joining surface (a plane parallel to the first direction and the second direction) between the positive electrode converged portion 410 and the cover member 700. In other words, the electrode assembly convex portion 411 has a shape recessed toward the cover member 700 from a surface of the positive electrode converged portion 410 on an electrode connecting portion 520 side. The electrode assembly convex portion 411 has the electrode assembly bulged portions 412 which project in a direction which intersects with the projecting direction (stacking direction) of the electrode assembly convex portion 411. In this embodiment, the electrode assembly bulged portions 412 project in a direction perpendicular to the projecting direction (in FIG. 6A, toward both sides in the first direction outward).

In the joined portion 20, the cover member 700 has the cover convex portion 701 which projects in a direction away from the positive electrode converged portion 410. The cover convex portion 701 is a circular cylindrical convex portion which projects in a direction (stacking direction) orthogonal to a joining surface (a plane parallel to the first direction and the second direction) between the positive electrode converged portion 410 and the cover member 700. In other words, the cover convex portion 701 has a shape recessed from a surface of the cover member 700 on a positive electrode converged portion 410 side in a direction away from the positive electrode converged portion 410. The cover convex portion 701 has cover convex end portions 702 on an end portion thereof in a direction (in FIG. 6A, toward both end sides in the first direction, outward) intersecting with the projecting direction (stacking direction) of the cover convex portion 701.

Due to the above-mentioned configuration, the current collector bulged portion 522 and the electrode assembly bulged portion 412 respectively project from a distal end of the current collector convex portion 521 and a distal end of the electrode assembly convex portion 411 toward both sides in the first direction thus forming the first bulged portions 21a, 21b. A cross section of the outer periphery of the joined portion 20 at the position of the second bulged portions 21c, 21d also has the same configuration as the cross section at the position of the first bulged portions 21a, 21b. Accordingly, the current collector bulged portion 522 and the electrode assembly bulged portion 412 respectively project from the distal end of the current collector convex portion 521 and the distal end of the electrode assembly convex portion 411 also toward both sides in the second direction thus forming the second bulged portions 21c, 21d. The bulged portions 21 (the first bulged portions 21a, 21b and the second bulged portions 21c, 21d) are formed by the current collector bulged portions 522, the electrode assembly bulged portions 412, and the cover convex end portions 702.

The projecting directions of the current collector convex portion 521, the electrode assembly convex portion 411, the cover convex portion 701, the current collector bulged portion 522, and the electrode assembly bulged portion 412 are not limited to the above-mentioned directions. The projecting directions of these constitutional elements may be directions inclined from the above-mentioned direction. The projecting shapes of these constitutional elements are also not limited to the above-mentioned projecting shapes. The cover convex end portion 702 may project in a direction (outward) intersecting with the projecting direction (stacking direction) of the cover convex portion 701. However, by preventing the cover convex end portion 702 from projecting outward, the joined portion 20 can be easily removed from a die of a joining tool after a joining operation. In this case, for removing the joined portion 20 from the die more easily, a width (a width in the first direction in FIG. 6A) of the cover convex end portion 702 may be gradually decreased toward a distal end of the cover convex end portion 702.

As shown in FIG. 6B, in a cross section of the outer periphery of the joined portion 20 at a position of the depressed portions 22 (the first depressed portions 22a, 22b), the current collector convex portion 521 has current collector convex end portions 523 on end portions thereof in a direction (outside) intersecting with the projecting direction (stacking direction) of the current collector convex portion 521. The electrode assembly convex portion 411 has an electrode assembly convex end portions 413 on end portions thereof in a direction (outside) intersecting with the projecting direction (stacking direction) of the electrode assembly convex portion 411. The cover convex portion 701 has a cover convex end portion 703 on an end portion thereof in a direction (outside) intersecting with the projecting direction (stacking direction) of the cover convex portion 701. Here, the current collector convex end portion 523, the electrode assembly convex end portion 413, and the cover convex end portion 703 do not project outward.

Due to the above-mentioned configuration, the current collector convex end portions 523, the electrode assembly convex end portions 413, and the cover convex end portions 703 form the first depressed portions 22a, 22b. A cross section of the outer periphery of the joined portion 20 at the position of the second depressed portions 22c, 22d has the same configuration as the cross section at the position of the first depressed portions 22a, 22b. Accordingly, the current collector convex end portions 523, the electrode assembly convex end portions 413, and the cover convex end portions 703 form also the second depressed portions 22c, 22d. The current collector convex end portion 523, the electrode assembly convex end portion 413, and the cover convex end portion 703 constitute the depressed portion 22.

In this manner, the plurality of respective bulged portions 21 are formed such that a bulging amount of the electrode connecting portion 520 toward the outside is large in a cross section on a plane parallel to the stacking direction compared to the depressed portion 22. In the same manner, the plurality of respective bulged portions 21 are formed such that a bulging amount of the positive electrode converged portion 410 toward the outside is large in a cross section on a plane parallel to the stacking direction compared to the depressed portion 22.

There may be a case where the current collector convex end portion 523 and the electrode assembly convex end portion 413 partially (or wholly) project outward. Also in this case, the projection amounts (bulging amounts) of the current collector convex end portion 523 and the electrode assembly convex end portion 413 are smaller than projection amounts of the current collector bulged portion 522 and the electrode assembly bulged portion 412. Also the cover convex end portion 703 may project outward, in the same manner as the cover convex end portion 702. However, by preventing the cover convex end portion 703 from projecting outward, the joined portion 20 can be easily removed from the die of a joining tool after a joining operation.

Figure 7:
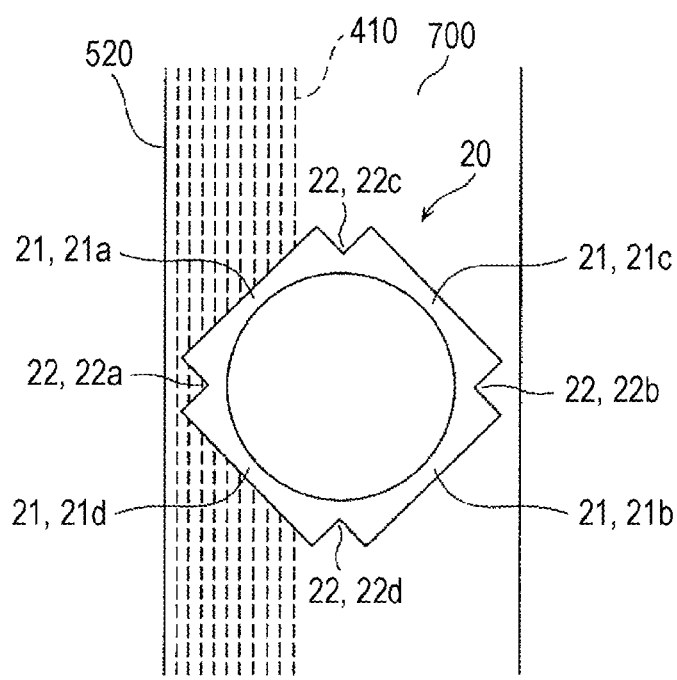
FIG. 7 is a plan view showing an arrangement position of the joined portion between the positive electrode current collector and the electrode assembly according to the embodiment.

Next, the arrangement position of the joined portion 20 is described. FIG. 7 is a plan view showing the arrangement position of the joined portion 20 between the positive electrode current collector 500 and the electrode assembly 400 according to this embodiment. FIG. 7 is a view of the joined portion 20 formed on the electrode connecting portion 520, the positive electrode converged portion 410, and the cover member 700 as viewed from a cover member 700 side. In such an arrangement, the position of an edge of the positive electrode converged portion 410 is indicated by a dotted line.

As shown in FIG. 7, the joined portion 20 is disposed such that the first direction and the second direction intersect with the width direction of the electrode connecting portion 520. The joined portion 20 is disposed such that the bulging directions of the first bulged portions 21a, 21b and the bulging directions of the second bulged portions 21c, 21d intersect with the width direction and the extending direction of the electrode connecting portion 520 (in FIG. 7, intersecting at 45°). With such a configuration, the first depressed portions 22a, 22b are disposed parallel to the width direction of the electrode connecting portion 520, and the second depressed portions 22c, 22d are disposed parallel to the extending direction of the electrode connecting portion 520.

In such a configuration, with respect to the positive electrode converged portion 410, there may be a case where, at the time of forming the joined portion 20, the plates on a projecting side (cover member 700 side) of the joined portion 20 are pulled toward the inside so that the plates overlap with each other in a stepped manner (end edges of the plates overlapping in a stepped manner indicated by a dotted line in the drawing). The positive electrode converged portion 410 has the configuration where the plates overlap with each other in a stepped manner such that the stacked number of plates is gradually decreased toward the end portion of the positive electrode converged portion 410. Accordingly, the first bulged portion 21a and the second bulged portion 21d are arranged so as to straddle over the plates overlapping in a stepped manner from a portion where the number of stacked plates is small to a portion where the number of stacked plates is large.

Figure 8A:
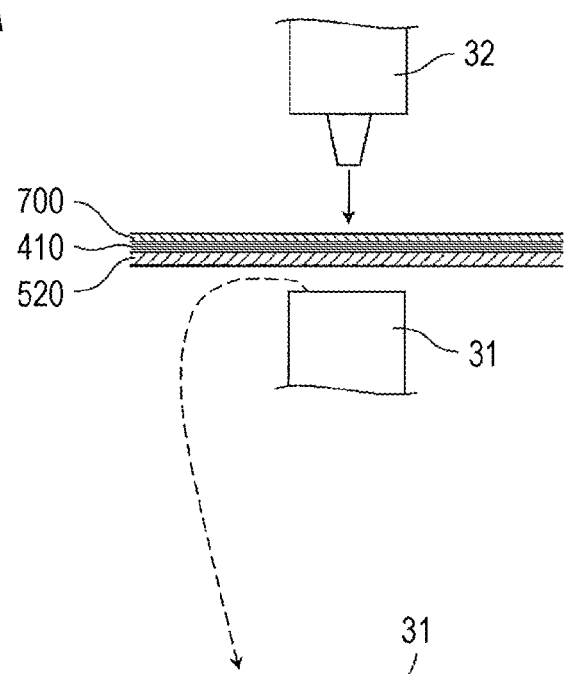
FIGS. 8A-8B are views showing a method of forming the joined portion between the positive electrode current collector and the electrode assembly according to the embodiment.
Figure 8B:
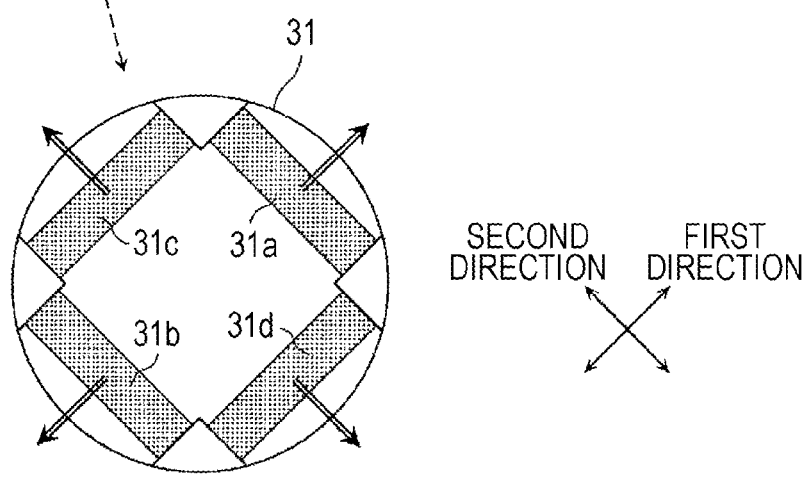

Next, a method of forming the joined portion 20 is described. FIGS. 8A-8B are views showing a method of forming the joined portion 20 between the positive electrode current collector 500 and the electrode assembly 400 according to this embodiment.

As shown in FIGS. 8A-8B, the electrode connecting portion 520, the positive electrode converged portion 410, and the cover member 700 are disposed in an overlapping manner and, at the same time, a die 31 is disposed below the electrode connecting portion 520, and a punch 32 having an upwardly projecting shape is disposed above the cover member 700. Rectangular-shaped movable parts 31a, 31b are disposed on both sides of an upper surface of the die 31 in the first direction, and rectangular-shaped movable parts 31c, 31d are disposed also on both sides of the die 31 in the second direction. The movable parts 31a, 31b are disposed in a slidable manner in the first direction, and the movable parts 31c, 31d are disposed in a slidable manner in the second direction.

In this configuration, in a state where the electrode connecting portion 520, the positive electrode converged portion 410 and the cover member 700 are placed on the die 31, by pressing the electrode connecting portion 520, the positive electrode converged portion 410 and the cover member 700 from above using the punch 32, the electrode connecting portion 520, the positive electrode converged portion 410 and the cover member 700 are plastically deformed (swaged). In such an operation, the movable parts 31a to 31d are made to slide and hence, the bulged portions 21 are formed. By making the movable parts 31a, 31b slide in the first direction, the first bulged portions 21a, 21b are formed. By making the movable parts 31c, 31d slide in the second direction, the second bulged portions 21c, 21d are formed.

Due to pressing using the punch 32, the convex portions (the current collector convex portions 521, the electrode assembly convex portion 411, and the cover convex portion 701) are formed and, along with such formation of the convex portions, the movable parts 31a to 31d are made to slide so that the bulged portions (the current collector bulged portions 522 and the electrode assembly bulged portions 412) are formed. By performing swaging (clinch inserting) using the die 31 and the punch 32 in this manner, the joined portion 20 can be formed.

In this embodiment, although the convex portions and the bulged portions are formed substantially simultaneously by a series of press working, a press working may be performed twice such that the convex portions are formed by first press working, and the bulged portions are formed by second press working. When the die 31 has a shape capable of forming the bulged portions even when the movable parts 31a to 31d are not disposed on the die 31, the movable parts 31a to 31d may not be disposed on the die 31.

As has been described above, according to the energy storage device 10 of the embodiment of the present invention, the electrode assembly 400 and the positive electrode current collector 500 include the joined portion 20 where the electrode assembly 400 and the positive electrode current collector 500 are joined to each other with a concavo-convex structure where either one of the electrode assembly 400 and the positive electrode current collector 500 projects toward the other of the electrode assembly 400 and the positive electrode current collector 500, and the outer periphery of the joined portion 20 has a non-circular shape. An outer periphery of a joined portion between an electrode assembly and a positive electrode current collector is formed in a circular shape in a conventional energy storage device. However, in this case, the outer periphery of the joined portion has a uniform joining strength over the whole periphery of the circular shape. In the conventional energy storage device, the outer periphery of the joined portion is formed in a circular shape so as to make a joining strength uniform. However, the configuration which has the uniform joining strength also means that although portions where a joining strength is low do not exist, portions having a high joining strength do not also exist. Accordingly, when the outer periphery of the joined portion has a circular shape, there may be a case where a joining strength becomes insufficient. In view of the above, the configuration is considered where a projecting height of a joined portion is increased so as to increase a projecting height of the joined portion. However, it is found that, in this case, there arises another drawback such as a drawback where a member forming the joined portion is stretched thus decreasing a plate thickness of the member (giving rise to a possibility that a plate is broken, for example).

To the contrary, inventors of the present invention have found that by intentionally making a joining strength non-uniform by forming the outer periphery of the joined portion in a non-circular shape, although there exist portions where a joining strength is low, portions having a high joining strength also exist, and such a configuration can overcome a shortage of a joining strength compared to the conventional configuration. Assuming a case where an outer periphery of the joined portion has a circular shape, the electrode assembly and the positive electrode current collector are joined to each other with a uniform joining strength F1, for example. On the other hand, in the case where the outer periphery of the joined portion is formed in a non-circular shape, although portions where the electrode assembly and the positive electrode current collector are joined to each other with a joining strength F2 lower than the joining strength F1 exist, portions where the electrode assembly and the positive electrode currant collector are joined to each other with a joining strength F3 larger than the joining strength F1 also exist. Accordingly, when a force between the joining strength F1 and the joining strength F3 is applied to the joined portion having the outer periphery formed in a circular shape, joining is released. However, when such a force is applied to the joined portion having the outer periphery formed in a non-circular shape, joining is not released. Accordingly, it is safe to say that the joined portion having the outer periphery formed in a non-circular shape can acquire a higher joining strength as a whole compared to the joined portion having the outer periphery formed in a circular shape. In this manner, according to the energy storage device 10, the outer periphery of the joined portion 20 between the electrode assembly 400 and the positive electrode current collector 500 has a non-circular shape and hence, strong joining can be acquired at portions where a joining strength is high whereby a joining strength between the electrode assembly 400 and the positive electrode current collector 500 can be enhanced.

The outer periphery of the joined portion 20 has a non-circular shape and hence, the joined portion 20 has also a rotation stopping function for suppressing relative rotation of the electrode assembly 400 and the positive electrode current collector 500 (suppressing a rotational torque) about the joined portion 20.

In the energy storage device 10, the outer periphery of the joined portion 20 has the plurality of bulged portions 21, and the depressed portions 22 which connect the plurality of bulged portions 21 to each other and hence, the difference in joining strength between these portions can be increased. Although a joining strength of the depressed portion 22 becomes low, a joining strength of the bulged portion 21 becomes high and hence, in the bulged portions 21, a joining strength between the electrode assembly 400 and the positive electrode current collector 500 can be enhanced.

By forming the bulged portions 21 on the outer periphery of the joined portion 20, a contact area between the electrode assembly 400 and the positive electrode current collector 500 can be increased. Accordingly, also due to the increase of the contact area between the electrode assembly 400 and the positive electrode current collector 500 by the bulged portions 21, a joining strength between the electrode assembly 400 and the positive electrode current collector 500 can be increased. Due to the increase of the contact area, a resistance value between the electrode assembly 400 and the positive electrode current collector 500 also can be decreased.

The bulged portion 21 is configured such that either one of the electrode assembly 400 and the positive electrode current collector 500 (in this embodiment, the positive electrode current collector 500) is largely bulged toward the outside compared to the depressed portion 22 and hence, one bulged portion bites into the other bulged portion. With such a configuration, interlocking can be firmly established at the bulged portions 21 and hence, a joining strength between the electrode assembly 400 and the positive electrode current collector 500 can be increased. In the depressed portions 22, it is difficult to establish interlocking and hence, the enhancement of a joining strength is not realized. However, interlocking is firmly established in the bulged portions 21. In this manner, in place of not establishing interlocking in the depressed portions 22, by firmly establishing interlocking in the bulged portions 21, a joining strength between the electrode assembly 400 and the positive electrode current collector 500 can be enhanced.

Two first bulged portions 21a, 21b are portions which are bulged opposite to each other (reverse directions) along the first direction and hence, two first bulged portions 21a, 21b are disposed on both sides of the joined portion 20 in the first direction. Accordingly, on both sides of the joined portion 20, a joining strength between the electrode assembly 400 and the positive electrode current collector 500 can be enhanced and hence, the electrode assembly 400 and the positive electrode current collector 500 can be strongly joined to each other in a well-balanced manner.

Two second bulged portions 21c, 21d are portions which are bulged opposite to each other (reverse directions) along the second direction and hence, two second bulged portions 21c, 21d are disposed also on both sides of the joined portion 20 in the second direction. Accordingly, at four corners of the joined portion 20, a joining strength between the electrode assembly 400 and the positive electrode current collector 500 can be enhanced and hence, the electrode assembly 400 and the positive electrode current collector 500 can be strongly joined to each other in a further well-balanced manner.

When end portions of the stacked plates of the electrode assembly 400 are projected at the joined portion 20, the plates are disposed in a stepped overlapping manner at the end portions thus giving rise to a case where the stacking number of the plates is decreased in a direction toward an end portion side. In this case, the stacking number of the plates is decreased toward a width direction of the electrode connecting portion 520 which is the leg portion of the positive electrode current collector 500 and hence, when joining is performed at a portion where the stacking number of the plates is small, a joining strength is lowered. To the contrary, the joined portion 20 is disposed such that the first direction and the second direction intersect with the width direction of the electrode connecting portion 520 of the positive electrode current collector 500 and hence, the bulged portions 21 can be disposed in a straddling manner between the portion where the stacking number is small and the portion where the stacking number is large. Accordingly, it is possible to suppress lowering of a joining strength between the electrode assembly 400 and the positive electrode current collector 500 and hence, a joining strength between the electrode assembly 400 and the positive electrode current collector 500 can be enhanced.

The first bulged portions 21a, 21b bulge in the first direction, and the second bulged portions 21c, 21d bulge in the second direction and hence, there may be a case where the outer periphery of the joined portion 20 has a shape elongated in the first direction or in the second direction. In this case, in forming the joined portion 20 on the electrode connecting portion 520 of the positive electrode current collector 500, when the first direction or the second direction agrees with the width direction of the electrode connecting portion 520, it is necessary to increase a width of the electrode connecting portion 520. Accordingly, also when the outer periphery of the joined portion 20 has a shape elongated in the first direction or in the second direction, the joined portion 20 is disposed such that the first direction and the second direction intersect with the width direction of the electrode connecting portion 520 and hence, even when the width of the electrode connecting portion 520 is narrow, the joined portion 20 can be formed.

A configuration on a negative electrode current collector 600 side is substantially equal to the configuration on a positive electrode current collector 500 side and hence, the configuration on the negative electrode current collector 600 side can acquire substantially the same advantageous effect as the configuration on the positive electrode current collector 500 side.

Although the energy storage device 10 according to the embodiment of the present invention has been described heretofore, the present invention is not limited to the above-mentioned embodiment. It should be construed that the embodiment disclosed in this specification is only for an exemplifying purpose in all aspects and is not limited. The scope of the present invention is not designated by the above-mentioned description but is designated by Claims, and it is intended that all modifications which fall within the meaning and the scope equivalent to Claims are also included in the scope of the present invention.

For example, in the above-mentioned embodiment, the outer periphery of the joined portion 20 is configured such that the projecting portions form an X shape as viewed in the stacking direction of the plates. However, the outer periphery of the joined portion 20 may not be formed in an X shape and may be formed in a + shape. The joined portion 20 shown in FIG. 7 may be disposed such that the joined portion 20 is rotated by 45° so that the first direction and the second direction are respectively directed in the width direction and the extending direction (or in the extending direction and the width direction) of the electrode connecting portion 520. For example, when the outer periphery of the joined portion 20 has a shape which is short in the first direction or the second direction, by disposing the joined portion 20 such that a short length direction of the joined portion 20 agrees with the width direction of the electrode connecting portion 520, even when a width of the electrode connecting portion 520 is narrow, the joined portion 20 can be formed.

When the outer periphery of the joined portion 20 has an X shape or a + shape, the outer periphery of the joined portion 20 has four bulged portions 21 (and four depressed portions 22). However, the number of bulged portions 21 (depressed portions 22) which the joined portion 20 has is not particularly limited. The joined portion 20 may have three or less, or five or more bulged portions 21.

Figure 9A:
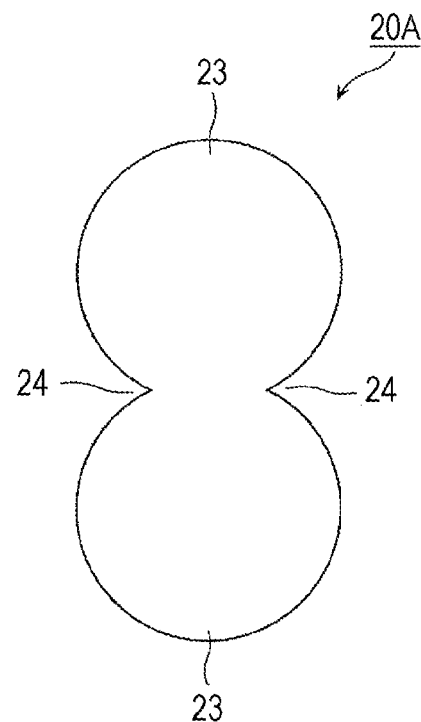
FIG. 9A is a plan view showing an external appearance of a joined portion between a positive electrode current collector and an electrode assembly according to a modification of the embodiment.
Figure 9B:
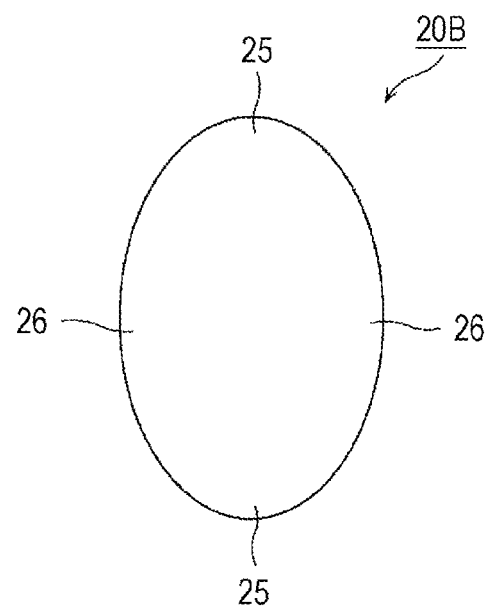
FIG. 9B is a plan view showing an external appearance of a joined portion between a positive electrode current collector and an electrode assembly according to a modification of the embodiment.

A joined portion having an outer periphery formed in a non-circular shape other than the above-mentioned shape may be formed in place of the joined portion 20. FIG. 9A and FIG. 9B are plan views respectively showing external appearances of joined portions 20A, 20B between a positive electrode current collector 500 and an electrode assembly 400 according to a modification of the embodiment of the present invention. As shown in these drawings, in FIG. 9A, the joined portion 20A is shown where an outer periphery of the joined portion 20A is formed by connecting two circles continuously. In this case, a bulged portion 23 having a high joining strength is formed on projecting portions of two circles respectively, and a depressed portion 24 having a low joining strength is formed on constricted portions at a boundary between two circles respectively. In FIG. 9B, the joined portion 20B having an outer periphery formed in a shape having no depressed portion such as an elliptical shape (an elongated circular shape) is formed. In this case, a bulged portion 25 having a high joining strength is formed on both end portions of the elliptical shape in the longitudinal direction respectively, and an end portion 26 having a low joining strength is formed on both end portions of the elliptical shape in the lateral direction respectively. In this manner, by forming the outer periphery of the joined portion in an elongated shape, a width of the electrode connecting portion 520 can be narrowed. The outer periphery of the joined portion is not limited to the shape in the above-mentioned embodiment and the shape in the modification of the embodiment provided that the outer periphery has a non-circular shape as viewed in the stacking direction of the plates.

In the above-mentioned embodiment, the joined portion 20 is formed into the joined portion having the concavo-convex structure where the positive electrode current collector 500 projects toward the electrode assembly 400 and the cover member 700. However, the joined portion 20 may be a joined portion having a concavo-convex structure where the cover member 700 and the electrode assembly 400 project toward the positive electrode current collector 500. For example, when the cover member 700 has the larger thickness than the positive electrode current collector 500, such a configuration is preferable.

In the above-mentioned embodiment, the positive electrode current collector 500 has two electrode connecting portions 520, and two joined portions 20 are formed on each of two electrode connecting portions 520. However, the number of joined portions 20 is not limited, and any number of joined portions 20 may be formed on the electrode connecting portion 520. Also the number of electrode connecting portions 520 is not limited, and the positive electrode current collector 500 may have only one electrode connecting portion 520, or may have three or more electrode connecting portions 520. When the number of electrode connecting portion 520 is set to one, the die 31 and the punch 32 can be easily disposed on both sides of the electrode connecting portion 520 and hence, a joined portion 20 can be easily formed.

In the above-mentioned embodiment, the electrode assembly 400 is a so-called vertical winding-type electrode assembly where a winding axis is parallel to the lid body 110. However, the electrode assembly 400 may be a so-called transverse winding-type electrode assembly where a winding axis is perpendicular to the lid body 110. The electrode assembly 400 is not limited to an electrode assembly of a winding type, and may be an electrode assembly of a stacking type where plates having a flat plate shape are stacked in multiple layers, or may be an electrode assembly of a type where a plate is folded in a bellows shape.

In the above-mentioned embodiment, the electrode connecting portion 520 of the positive electrode current collector 500 and the positive electrode converged portion 410 of the electrode assembly 400 are joined to each other. However, the positive electrode current collector 500 has a conductive member such as a lead connected to the electrode connecting portion 520 and hence, the positive electrode converged portion 410 may be joined to the conductive member. In this case, the positive electrode converged portion 410 and the conductive member are joined to each other thus forming a joined portion 20.

In the above-mentioned embodiment, the positive electrode current collector 500, the electrode assembly 400 and the cover member 700 are joined to each other. However, a member other than the positive electrode current collector 500, the electrode assembly 400 and the cover member 700 also may be joined together. Alternatively, the cover member 700 may not be provided, and a joined portion 20 may be formed by joining the positive electrode current collector 500 and the electrode assembly 400 to each other.

In the above-mentioned embodiment, the positive electrode current collector 500 and the electrode assembly 400 are joined to each other only at the joined portions 20. However, besides joining by the joined portions 20, joining by another joining method may be performed. As another joining method, for example, ultrasonic welding, resistance welding, arc welding, welding by irradiation of a laser beam or an electron beam or the like can be named.

In the above-mentioned embodiment, the positive electrode current collector 500 is configured such that the joined portion 20 is formed on both of two electrode connecting portions 520. However, the positive electrode current collector 500 may be configured such that the joined portion 20 is formed on either one of two electrode connecting portions 520. In the energy storage device 10, the joined portion is formed on both the positive electrode current collector 500 and the negative electrode current collector 600. However, the energy storage device 10 may be configured such that the joined portion is formed either one of the positive electrode current collector 500 and the negative electrode current collector 600.

In the above-mentioned embodiment, as an example of a method of plastically deforming the positive electrode current collector 500 and the electrode assembly 400 in joining the positive electrode current collector 500 and the electrode assembly 400 to each other, clinch inserting is exemplified. However, the joining method of the positive electrode current collector 500 and the electrode assembly 400 is not limited to the clinch inserting, and joining by swaging which differ from the clinch inserting, joining using a rivet or the like may be adopted.

The configurations which are made by arbitrarily combining the configuration of the above-mentioned embodiment and the configurations of the modifications of the embodiment are also included in the scope of the present invention.

The present invention can be realized not only in the form of such an energy storage device 10 but also in the form of joining structure between the electrode assembly 400 and the positive electrode current collector 500 (or the negative electrode current collector 600) which the energy storage device 10 includes.

INDUSTRIAL APPLICABILITY

The present invention is applicable to an energy storage device such as a lithium ion secondary battery.

What is claimed is:
1. An energy storage device comprising:
an electrode assembly including stacked plates, and
a current collector joined to the stacked plates,
wherein the electrode assembly and the current collector include a joined portion where the electrode assembly and the current collector are joined to each other with a concavo-convex structure where either one of the electrode assembly and the current collector projects toward the other of the electrode assembly and the current collector, wherein an outer periphery of the joined portion has a non-circular shape as viewed from a stacking direction of the plates in the joined portion, wherein the outer periphery of the joined portion has a plurality of bulged portions and at least one depressed portion which connects the plurality of bulged portions to each other as viewed in the stacking direction, wherein the plurality of bulged portions have a first bulged portion which bulges along a first direction perpendicular to the stacking direction as viewed in the stacking direction and a second bulged portion which bulges along a second direction which is perpendicular to the stacking direction and intersects with the first direction as viewed in the stacking direction, and wherein the current collector has a leg portion on which the joined portion is formed, and the joined portion is arranged such that the first direction and the second direction intersect with a width direction of the leg portion which is perpendicular to the stacking direction.

2. The energy storage device according to claim 1, wherein the plurality of bulged portions are formed such that a bulging amount of one side of the bulged portion toward the outside is large in a cross section on a plane parallel to the stacking direction compared to the depressed portion.

3. The energy storage device according to claim 1, wherein the plurality of bulged portions have two first bulged portions which bulge opposite to each other along the first direction perpendicular to the stacking direction as viewed in the stacking direction.

4. The energy storage device according to claim 3, wherein the plurality of bulged portions further have two second bulged portions which bulge opposite to each other along the second direction which is perpendicular to the stacking direction and intersects with the first direction as viewed in the stacking direction.

5. The energy storage device according to claim 1, wherein the plurality of bulged portions further comprises:
a third bulged portion formed opposite the first bulged portion in the first direction; and
a fourth bulged portion formed opposite the second bulged portion in the second direction.

6. The energy storage device according to claim 5, wherein the at least one depressed portion comprises four depressed portions which are alternately formed with the plurality of bulged portions around the outer periphery of the joined portion.

7. A joined portion for joining a current collector and an electrode assembly of an energy storage device, the joined portion comprising:
a concavo-convex structure projecting from a leg portion of the current collector, and comprising a projecting portion of the electrode assembly and a projecting portion of the current collector, an outer periphery of the concavo-convex structure having a non-circular shape as viewed from a stacking direction of stacked plates of the electrode assembly; and
a plurality of bulged portions formed on the outer periphery and including:
a first bulged portion which bulges along a first direction perpendicular to the stacking direction as viewed in the stacking direction; and
a second bulged portion which bulges along a second direction which is perpendicular to the stacking direction and intersects with the first direction as viewed in the stacking direction,
wherein the leg portion comprises a width direction which is perpendicular to the stacking direction, and the first direction and the second direction intersect with the width direction.

8. The joined portion according to claim 7, further comprising:
a depressed portion formed on the outer periphery and connecting the plurality of bulged portions as viewed in the stacking direction.

9. The joined portion according to claim 8, wherein the plurality of bulged portions further comprises:
a third bulged portion formed opposite the first bulged portion in the first direction; and
a fourth bulged portion formed opposite the second bulged portion in the second direction.

10. The joined portion according to claim 9, wherein the depressed portion comprises a plurality of depressed portions which are alternately formed with the plurality of bulged portions around the outer periphery of the concavo-convex structure.

11. The joined portion according to claim 10, wherein the plurality of depressed portions comprises:
a pair of first depressed portions that are formed on opposite sides of the outer periphery of the concavo-convex structure, and parallel to the width direction of the leg portion; and
a pair of second depressed portions that are formed on opposite sides of the outer periphery of the concavo-convex structure, and perpendicular to the width direction of the leg portion.

12. The joined portion according to claim 7, wherein the projecting portion of the current collector projects toward the electrode assembly and comprises a circular cylindrical convex portion, and
wherein the projecting portion of the electrode assembly comprises a circular cylindrical convex portion.

13. The joined portion according to claim 7, wherein the energy storage device includes a cover member formed on a side of the electrode assembly opposite the current collector, and the concavo-convex structure further comprises a projecting portion of the cover member.

14. The joined portion according to claim 13, wherein the concavo-convex structure comprises a swaged portion comprising the projecting portion of the electrode assembly, the projecting portion of the current collector and the projecting portion of the cover member.

15. The joined portion according to claim 14, wherein the projecting portion of the cover member comprises a convex end portion formed on the electrode assembly bulged portion and projecting away from the electrode assembly bulged portion in the stacking direction.

16. The joined portion according to claim 13, wherein the plurality of bulged portions comprises:
an electrode assembly bulged portion formed on the projecting portion of the electrode assembly; and
a current collector bulged portion formed on the projecting portion of the current collector.

* * * * *